US011955142B1

United States Patent
Oulès

(10) Patent No.: US 11,955,142 B1
(45) Date of Patent: Apr. 9, 2024

(54) VIDEO EDITING USING MUSIC CHARACTERISTICS

(71) Applicant: GoPro, Inc., San Mateo, CA (US)

(72) Inventor: Guillaume Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 448 days.

(21) Appl. No.: 17/201,448

(22) Filed: Mar. 15, 2021

(51) Int. Cl.
  *G11B 27/036* (2006.01)
  *G10H 1/00* (2006.01)
  *G10H 1/36* (2006.01)

(52) U.S. Cl.
  CPC ......... *G11B 27/036* (2013.01); *G10H 1/0008* (2013.01); *G10H 1/368* (2013.01); *G10H 2210/005* (2013.01); *G10H 2210/056* (2013.01); *G10H 2210/061* (2013.01); *G10H 2210/066* (2013.01); *G10H 2210/076* (2013.01); *G10H 2240/056* (2013.01)

(58) Field of Classification Search
  CPC .... G11B 27/036; G10H 1/0008; G10H 1/368; G10H 2210/005; G10H 2210/056; G10H 2210/061; G10H 2210/066; G10H 2210/076; G10H 2240/056

USPC ......................................................... 386/285
See application file for complete search history.

(56) References Cited

U.S. PATENT DOCUMENTS

| | | | |
|---|---|---|---|
| 8,638,966 B2 * | 1/2014 | Taylor ................. | G10H 1/0033 381/301 |
| 10,127,943 B1 * | 11/2018 | Patry ........................ | H04N 5/76 |
| 10,679,670 B2 * | 6/2020 | Patry ........................ | H04N 5/76 |
| 10,991,396 B2 * | 4/2021 | Patry ...................... | G11B 27/28 |
| 11,563,902 B2 * | 1/2023 | Kim ...................... | H04N 5/2621 |
| 11,568,900 B1 * | 1/2023 | Achddou ............. | G11B 27/031 |
| 11,689,692 B2 * | 6/2023 | Oules ...................... | H04N 5/783 386/343 |
| 2008/0239888 A1 * | 10/2008 | Kotani .................... | G06F 16/68 369/30.08 |
| 2023/0124691 A1 * | 4/2023 | Oules ................... | G11B 27/031 |

* cited by examiner

*Primary Examiner* — Helen Shibru
(74) *Attorney, Agent, or Firm* — ESPLIN & ASSOCIATES, PC

(57) ABSTRACT

Music may be selected to provide accompaniment for a video edit of a video. Characteristics of the music may be determined and used to select the types of visual effects that are applied in the video edit. The characteristics of the music may be extracted from MIDI file/metadata track containing MIDI information for the music.

20 Claims, 6 Drawing Sheets

702

704

706

VIDEO EDITING USING MUSIC CHARACTERISTICS

FIELD

This disclosure relates to editing videos using music characteristics.

BACKGROUND

A user may wish to create a video edit in which visual effects are synchronized to music of the video edit. Manually applying visual effects to events within the music may be difficult and time consuming.

SUMMARY

This disclosure relates to editing videos using music characteristics. Video information, music information, and/or other information may be obtained. The video information may define a video. The video may include visual content having a progress length. The music information may define music to provide accompaniment for a video edit of the video. Characteristics of the music may be determined. One or more types of visual effect to be applied to the visual content may be selected based on the characteristics of the music and/or other information. The video edit of the video may be generated. The video edit may include the type(s) of visual effect applied to the visual content and may include accompaniment of the music.

A system that edits videos using music characteristics may include one or more electronic storage, processor, and/or other components. The electronic storage may store video information, information relating to a video, information relating to visual content, music information, information relating to music, information relating to characteristics of the music, information relating to visual effects, information relating to a video edit, and/or other information.

The processor(s) may be configured by machine-readable instructions. Executing the machine-readable instructions may cause the processor(s) to facilitate editing videos using music characteristics. The machine-readable instructions may include one or more computer program components. The computer program components may include one or more of a video information component, a music information component, a characteristic component, a visual effect component, a generation component, and/or other computer program components.

The video information component may be configured to obtain video information and/or other information. The video information may define a video. The video may include visual content having a progress length.

The music information component may be configured to obtain music information and/or other information. The music information may define music to provide accompaniment for a video edit of the video. In some implementations, the music information may be stored in a MIDI file. The MIDI file may define characteristics of the music.

The characteristic component may be configured to determine characteristics of the music. In some implementations, the characteristics of the music may include pitch and velocity of notes of the music. In some implementations, the characteristics of the music may further include duration of the notes of the music. In some implementations, the characteristics of the music may further include instrument types for the notes of the music.

In some implementations, determination of the characteristics of the music may include determination of beat and melody of the music. In some implementations, determination of the characteristics of the music may include extraction of the characteristics of the music from the MIDI file.

The visual effect component may be configured to select one or more types of visual effect to be applied to the visual content. The type(s) of visual effect to be applied to the visual content may be selected based on the characteristics of the music and/or other information.

In some implementations, a first type of visual effect to be applied to the visual content may be selected based on the beat of the music. A second type of visual effect to be applied to the visual content may be selected based on the melody of the music. The first type of visual effect may be different from the second type of visual effect. In some implementations, the first type of visual effect may include a zoom effect, and the second type of visual content may include a lighting effect.

The generation component may be configured to generate the video edit of the video. The video edit may include the type(s) of visual effect applied to the visual content and may include accompaniment of the music.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
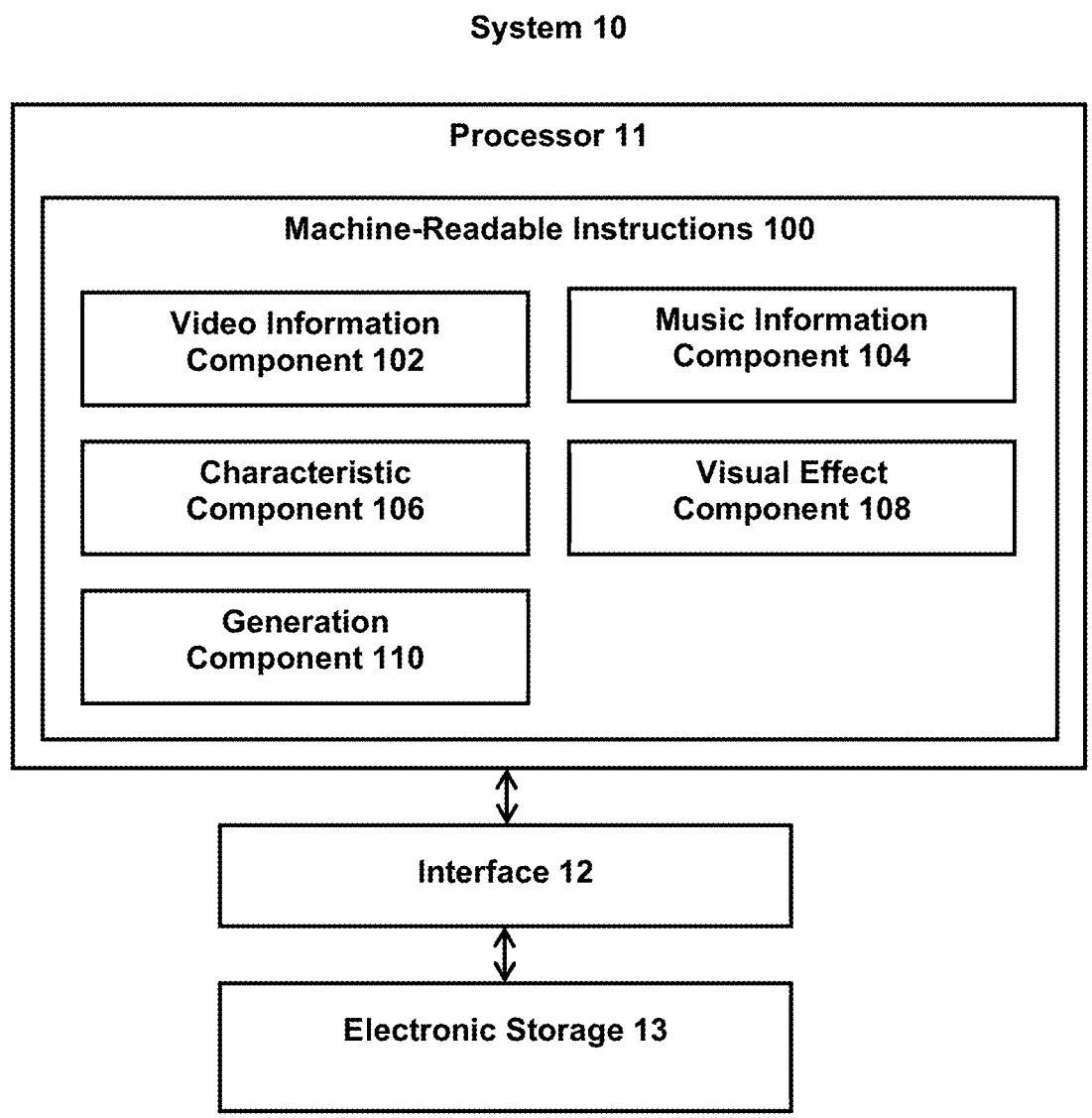
FIG. 1 illustrates a system that edits videos using music characteristics.

FIG. 1 illustrates a system 10 that edits videos using music characteristics. The system 10 may include one or more of a processor 11, an interface 12 (e.g., bus, wireless interface), an electronic storage 13, and/or other components. Video information, music information, and/or other information may be obtained by the processor 11. The video information may define a video. The video may include visual content having a progress length. The music information may define music to provide accompaniment for a video edit of the video. Characteristics of the music may be determined by the processor 11. One or more types of visual effect to be applied to the visual content may be selected by the processor 11 based on the characteristics of the music and/or other information. The video edit of the video may be generated by the processor 11. The video edit may include the type(s) of visual effect applied to the visual content and may include accompaniment of the music.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, music information, information relating to music, information relating to characteristics of the music, information relating to visual effects, information relating to a video edit, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate editing videos using music characteristics. The machine-readable instructions 100 may include one or more computer program components. The machine-readable instructions 100 may include one or more of a video information component 102, a music information component 104, a characteristic component 106, a visual effect component 108, a generation component 110, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations.

For example, the video information component 102 may obtain video information from a storage location, such as the electronic storage 13, electronic storage of information and/or signals generated by one or more sensors, electronic storage of a device accessible via a network, and/or other locations. The video information component 102 may obtain video information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to generate a video edit (e.g., a music-synchronized video edit). The video information defining a video may be obtained based on the user's selection of the video through the user interface/video application. Other selections of video for retrieval of video information are contemplated.

Figure 3:
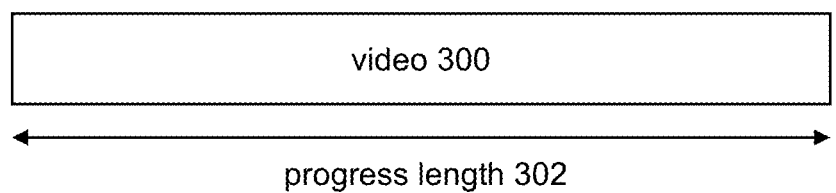
FIG. 3 illustrates an example video.

The video information may define a video. The video may include video content (e.g., visual content, audio content) having a progress length. FIG. 3 illustrates an example video 300. The video 300 may have a progress length 302. In some implementations, the video 300 may represent a portion of a longer video. The video 300 may represent a video or a portion of a longer video that has been selected for inclusion in a video edit. For example, the video 300 may represent a video/a video portion that has been selected to be included in a music synchronized video edit, with one or more visual effects applied to the video 300. The visual effect(s) applied to the video 300 may be synchronized to music accompanying the video edit. For instance, the video 300 may be combined with music to generate a looping video edit. A looping video edit may refer to a video that repeats and/or that may be repeated to provide continuous/unbroken footage (e.g., with seamless video and audio loops). Visual effects applied to the video 300 may be synchronized to the music of the looping video edit so that the visual effects occur/are shown within the looping video edit along with events within the music.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The music information component 104 may be configured to obtain music information and/or other information. Obtaining music information may include one or more of accessing, acquiring, analyzing, determining, examining, identifying, loading, locating, opening, receiving, retrieving, reviewing, selecting, storing, and/or otherwise obtaining the music information. The music information component 104 may obtain music information from one or more locations. For example, the music information component 104 may obtain music information from a storage location, such as the electronic storage 13, electronic storage of information and/or signals generated by one or more sensors, electronic storage of a device accessible via a network, and/or other locations. The music information component 104 may obtain music information from one or more hardware components (e.g., a sound sensor) and/or one or more software components (e.g., software running on a computing device).

In some implementations, the music information component 104 may obtain music information based on user interaction with a user interface/application (e.g., video editing application, video player application), and/or other information. For example, a user interface/application may provide option(s) for a user to select music for a video edit (e.g., music to provide accompaniment for the video edit). The music information defining music may be obtained based on the user's selection of the music through the user interface/video application. In some implementations, the music information component 104 may obtain music information based on analysis of the video. For example, the music to provide accompaniment for a video edit of a video may be selected based on analysis of the video used to generate the video edit. Other selections of music for retrieval of music information are contemplated.

Figure 4:
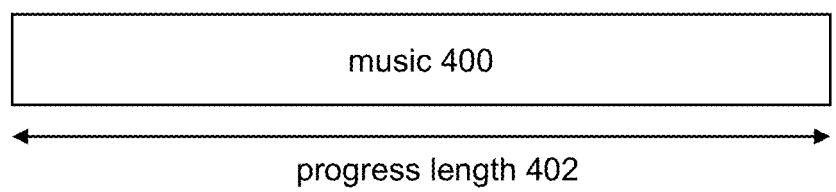
FIG. 4 illustrates an example music.

The music information may define music to provide accompaniment for a video edit of the video. The music may provide accompaniment for entirety or one or more portions of the video edit. For example, the music may be used to provide a seamless audio loop for a looping video edit. The music may include vocal and/or instrumental sounds. The music may have a progress length (e.g., song duration). FIG. 4 illustrates an example music 400. The music 400 may have a progress length 402. The progress length 402 of the music 400 may be same as or different from (shorter than, longer than) the progress length 302 of the video 300. In some implementations, the music may include MIDI music. MIDI music may refer to music generated via Musical Instruct Digital Interface (MIDI) protocol. MIDI music may refer to music stored in MIDI format. For example, the music selected by the music information component 104 may include recording of music generated by one or more computing devices using information stored in a MIDI file and/or the MIDI file itself, which may be used to provide playback using one or more computing devices.

The music information may define video by including information that defines one or more content, qualities, attributes, features, and/or other aspects of the music. For example, the music information may define music by including information that makes up the content of the music and/or information that is used to determine the content of the music. For instance, the music information may include information that makes up and/or is used to determine the characteristics and timing of sounds within the music. The music information may include a recording of the music and/or information that makes up and/or is used to facilitate playback of the music. For example, the music information may define a recording of the music, which may be played back. As another example, the music information may define characteristics of the music (e.g., such as in MIDI format), and the characteristics of the music may be used to effectuate playback of the music. Other types of music information are contemplated.

Characteristics of music may refer to feature, quality, property, and/or other characteristics of the music. Characteristics of music may include static characteristics (characteristics that do not change throughout the music) and/or dynamic characteristics (characteristics that changes throughout the music). Characteristics of music may refer to feature, quality, property, and/or other characteristics of music that make up the content of the music. For example, the music may include notes, and the characteristics of the music may include the pitch, velocity (e.g., intensity, loudness, softness of volume), duration, vibrato, clock signals, and/or other characteristics of the notes of the music. In some implementations, the characteristics of the music may further include instrument types (e.g., which instrument should be used to play the note, channel identifier for the note) for the notes of the music. These characteristics of the music may be used by an application (e.g., video editing application, video player application) to determine when and/or how to play the notes during playback of the video edit/music.

The characteristics of the music may make up, define, and/or be used to determine occurrence of events within the music. An event within the music may refer to a thing that occurs within the music. For example, an event within the music may include a beat, a rhythm, a note, a melody, and/or other event within the music. A beat may refer to a basic unit of time of the music. A beat may refer to the pulse of the music. A beat may refer to a basic rhythmic unit of a measure of the music. A note may refer to a musical sound. A note may represent the pitch and duration of a musical sound. A rhythm may refer to regular, repeated pattern of movement or sound within the music. A rhythm may refer to a movement marked by regulated succession of strong and weak elements, or of opposite or different conditions. A melody may refer to a linear succession of musical tones that is perceived as a single entity. A melody may refer to a combination of pitch and rhythm. An event within the music may occur at a point in time or over a duration of time within the music. An event within the music may be repeated within the music. An event within the music may be repeated at regular time interval. An event within the music may occur regularly over the entirety of the music or over one or more portions of the music.

Figure 5:
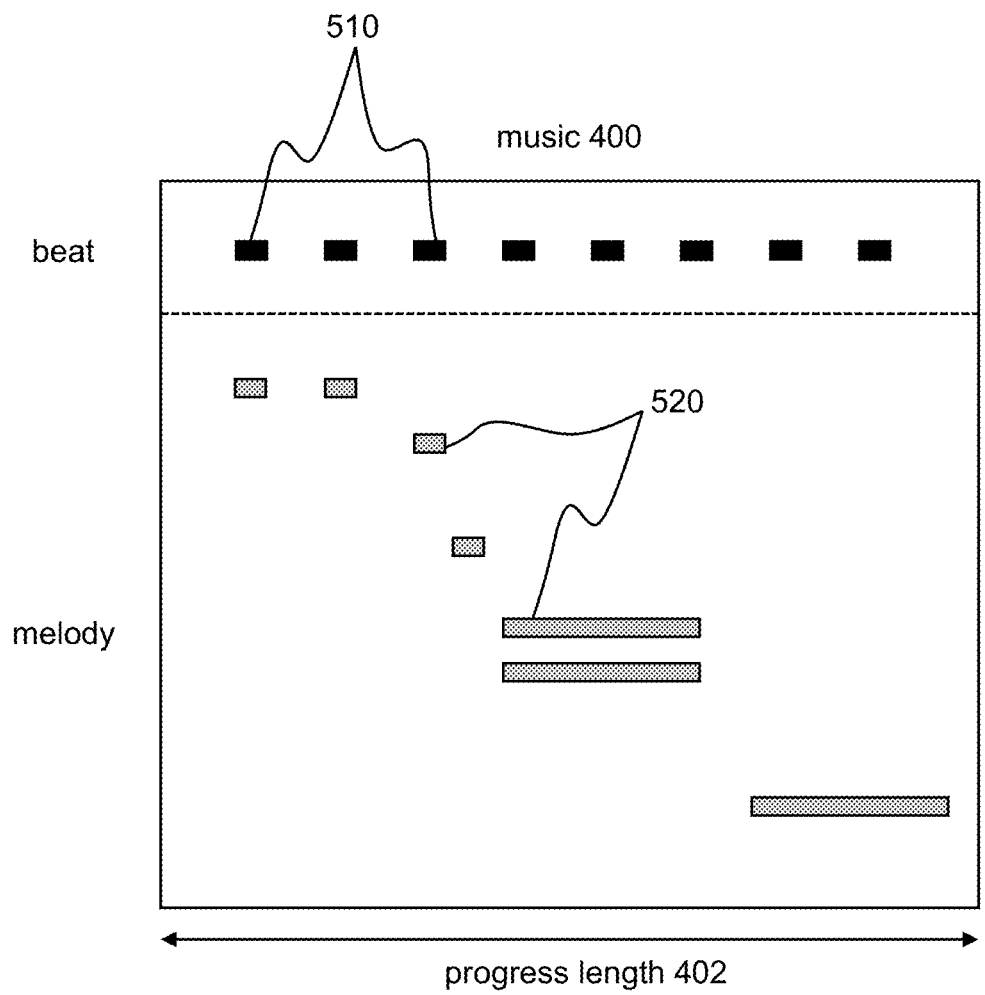
FIG. 5 illustrates example beats and melody of music.

FIG. 5 illustrates example beats and melody of the music 400. Individual bars shown in FIG. 5 may indicate occurrence of when events within the music 400 occurs over the progress length 402 of the music. As shown in FIG. 5, the music 400 may include regularly occurring beats 510 within the progress length 402 of the music 400. The music 400 may include melody 520. The melody 520 may include different notes that are played at different moments within the progress length 402 of the music 400. The length of the melody 520 may correspond to the duration for which the note is played. The vertical position of the melody 520 may correspond to the type of note that is played.

In some implementations, the music information may be stored in one or more MIDI file (MIDI information). The music information may be stored in the MIDI files using the MIDI protocol. The MIDI file(s)/MIDI information may define characteristics of the music. In some implementations, the characteristics of the music may be embedded in one or more metadata tracks of the music. For example, a file that defines a recording of the music may include a metadata track that defines the characteristics of the music (e.g., metadata track including MIDI information defining characteristics of the music). Use of the MIDI file and/or embedding such information in the metadata track of the music file may enable the characteristics of the music to be extracted for use in applying visual effects. For example, use of the MIDI file may allow for direct extraction of the characteristics of the music from the MIDI file, and without analysis of the music itself (e.g., without analyzing recording of the music to identify beat/melody within the music). Similarly, embedding such information in the metadata track of the music file may enable the characteristics of the music to be extracted from the metadata track without analysis of the music itself.

The characteristic component 106 may be configured to determine characteristics of the music. Determining the characteristics of the music may include ascertaining, establishing, extracting, finding, identifying, obtaining, and/or otherwise determining the characteristics of the music. In some implementations, the characteristics of the music may be determined based on analysis of the music. For example, a recording of the music may be analyzed to determine the characteristics of the music. However, such analysis of the music may be time consuming and/or process intensive. Such analysis of music may allow for estimation of the characteristics of the music, but may not result in exact/precise determination of the characteristics of the music.

The characteristic component 106 may determine the characteristics of the music by extracting the characteristics of the music from the music information. For example, the music information may include information that define the characteristics of the music using MIDI protocol, and/or such/similar information stored in one or more metadata tracks of the music. Rather than analyzing the music itself, the characteristic component 106 may directly pull the characteristics of the music (and/or information that allows for determination of the characteristics of the music) directly from the music information (e.g., from a MIDI file, from a metadata track).

For example, referring to FIG. 5, analysis of the music to determine the beat and melody of the music 400 may result in imprecise determination of the beat and the melody. For instance, the timing of the beat and/or notes include the music 400 may be inaccurately identified. Precise analysis of the music may consume more processing resource and/or time than is desired.

Instead of using music analysis, the characteristic component 106 may determine the characteristics of the music 400 (e.g., beat and melody of the music 400, pitch, velocity, duration, vibrato, clock signals, instrument types of the notes) by extracting the characteristics from the music information. The music information may identify and/or provide information from which the exact/precise characteristics of the music may be determined, and the characteristic component 106 may pull this information from the music information. Such determination of the characteristics of the music may enable more exact/precise synchronization between the music of the video edit and the visual effects used in the video edit. Such determination of the characteristics of the music may be less resource intensive (e.g., consume less power/memory, require less processing power/time) than determination of the characteristics of the music from analysis of the music.

The visual effect component 108 may be configured to select one or more types of visual effect to be applied to the visual content. Visual effect may refer to a process/tool that manipulates visual content. Visual effect may change one or more visual characteristics of the visual content. For example, visual effect may change one or more visual characteristics of the visual content, add one or more visual characteristics to the visual content, and/or remove one or more visual characteristics of the visual content. Visual effect may change visual characteristic(s) at one or more points/duration within the progress length of the visual content. Visual effect may change visual characteristic(s) over the entire spatial extent of the visual content or for one or more spatial portions of the visual content. For example, visual effect may be applied globally to change visual characteristic(s) of the entire field of view of the visual content. As another example, image segmentation/object identification may be performed to separate depiction of different objects within the visual content, and the visual effect may be applied locally to depiction of one or more objects.

The type(s) of visual effect to be applied to the visual content may be selected based on the characteristics of the music and/or other information. The type(s) of visual effect to be applied to the visual content may be selected based on feature, quality, property, and/or other characteristics of the music. The type(s) of visual effect to be applied to the visual content may be selected based events within the music. For example, the type(s) of visual effect to be applied to the visual content may be selected based a beat, a rhythm, a note, a melody, and/or other event within the music.

Different types of visual effect may be selected based on different characteristics/different combination of characteristics of the music. For example, different types of visual effect may be selected based different characteristics of a beat, a rhythm, a note, a melody, and/or other event within the music. Different types of visual effect may be selected based on different combination of beat, a rhythm, a note, a melody, and/or other event within the music. Use of different types of effects for different characteristics/events within the music may allow for dynamic effects to be applied to the video edit and result in variations of the effects within the video edit.

In some implementations, strength of the visual effect may be selected based on different characteristics/different combination of characteristics of the music. For example, a visual effect may be selected for different notes within a melody, and the strength of the visual effect may change (e.g., increase, decrease) based on the pitch, velocity, duration, vibrato, clock signals, and/or other characteristics of the notes.

The visual effect may be selected for application at one or more moments (e.g., point(s) in time, duration(s) of time) within the progress length of the visual content. The visual effect may be selected for application at the moments corresponding to different characteristics of the music. For example, the visual effect may be selected for application at moments in which events (e.g., beats, melody) occur within the music. For example, the visual effect may start with the beats/notes within the music. The visual effect may be selected for application to maximize its effect at moments in which events occur within the music. For example, the visual effect may start before the beats/notes within the music so that its effect is fully realized at the beats/notes within the music. Such application of the visual effect may provide for exact/precise synchronization between the visual effect and the music (e.g., visual effect appearing within the visual content with beat of the music).

Figure 6:
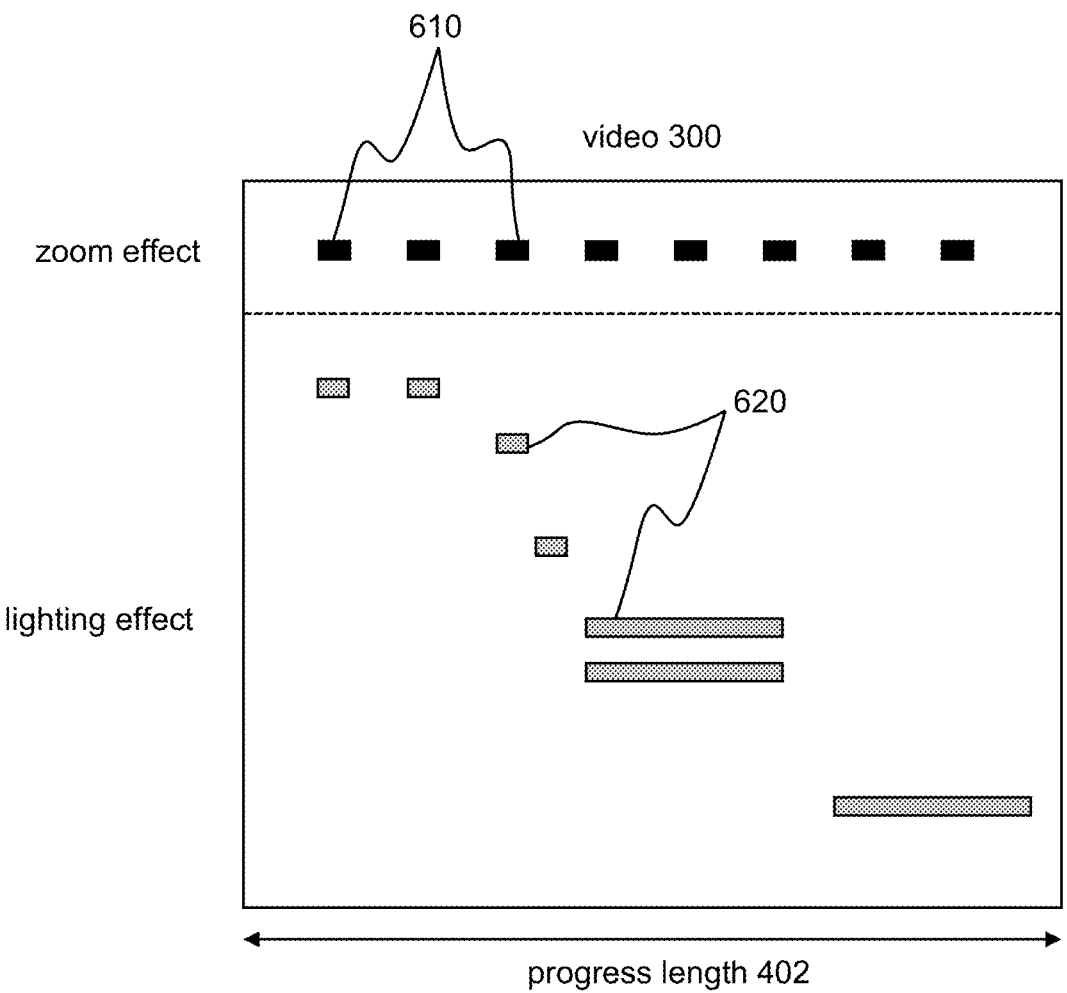
FIG. 6 illustrates example effects applied based on beats and melody of music.

FIG. 6 illustrates example effects applied based on beats and melody of music. In FIG. 6, different types of visual effect may be applied to the visual content based on the beat and the melody of the music. For example, zoom effect 610 may be applied to the visual content based on the beat of the music and lighting effect 620 may be applied to the visual content based on the melody of the music.

The zoom effect 610 may be applied to the video at moments in which beat occur within the accompanying music. The zoom effect 610 may include change in how much of the visual content is included within the video edit. The zoom effect 610 may change the size of the field of view of the visual content that is included in the video edit. For example, at each beat of the music, the video edit may cycle through different zoom levels. For instance, at every beat of the music, the video edit may zoom in and out (e.g., zoom in at the first beat, zoom out at the second feat, and so forth).

The lighting effect 620 may be applied to the video at moments in which notes/melody occur within the accompany music. The lighting effect 620 may emphasize light depicted within the visual content. The light depicted within the visual content may include light that was captured within the video during capture of the visual content and/or light that was inserted into the video after capture (e.g., post-processing to insert light into the video). For example, the lighting effect 620 may stretch out light depicted within the visual content. Different strength of the lighting effect 620 may be used based on different characteristics of the notes/melody within the music. For example, the extent to which the light depicted within the visual content is stretched out may correspond to the volume and/or duration of the notes/melody within the music. Louder/longer notes/melody may result in the light being stretched out longer than quieter/shorter notes/melody. Other types of visual effect and use of other characteristics of the music to select effects are contemplated.

Figure 7:
FIG. 7 illustrates example effects applied to a video.
Figure 7:
Figure 7:

FIG. 7 illustrates example effects applied to a video. FIG. 7 may include three video frames 702, 704, 706 of a video edit. Effects applied to the video in the video edit may include a zoom effect, a lighting effect, and/or other effects. For example, the zoom effect may be applied to zoom in and out of the video at every beat of the music in the video edit. The lighting effect may be applied to notes/melody in the music to accentuate light depicted within the video.

For example, as shown in FIG. 7, the video frame 702 may include a view of the video. The video frame 704 may include a zoomed-in view of the video (to include a small spatial extent of the video) and may correspond to a beat of the music. The video frame 706 may include a zoomed-out view of the video (to include entire spatial extent of the video) and may correspond to the next beat of the music.

The video frame 702 may not include any lighting effect. The video frames 704, 706 may include a lighting effect that laterally stretches light depicted within the video frames 704, 706. The video frame 702 may not include any lighting effect due to the video frame 702 appearing in the video edit at a moment when no notes are played. The video frames 704, 706 may include light effects due to the video frames 702, 706 appearing in the video edit at moments when notes are played.

The strength of the lighting effect may correspond to the characteristics of the notes/melody within the music. For example, the extent to which the light depicted within the video frames 704, 706 are stretched out may correspond to the volume and/or duration of the notes within the music. The strength of the lighting effect may be stronger in the video frame 704 than in the video frame 706 due to louder/longer duration of the note(s) at the moment corresponding to the video frame 704 than at the moment corresponding to the video frame 706. The stronger strength of the lighting effect in the video frame 704 may cause greater stretching out of the light in the video frame 704 than in the video frame 706. In some implementations, stronger strength of the lighting effect in a video frame may cause longer duration of the light effect in the visual content (e.g., stronger lighting effect takes longer time to disappear than weaker lighting effect).

In some implementations, other types of effect may be selected for generation of the video edit. For example, one or more audio effects (changing audio characteristics of the video in the video edit) and/or one or more temporal effects (changing timing characteristics/perceived speed of the video in the video edit) may be selected for generation of the video edit. In some implementations, other types of effect may be selected based on the characteristics of the music and/or other information.

The generation component 110 may be configured to generate the video edit of the video. A video edit may refer to a particular arrangement and/or manipulation of one or more portions (e.g., clips) of the video. A video edit may include arrangement of the video with the music. A video edit may include one or more effects (e.g., visual effect, audio effect, temporal effect). For example, the video edit may include one or more types of the visual effect applied to the visual content of the video and may include accompaniment of the music. The effects (e.g., visual effect, audio effect, temporal effect) in the video edit may be synchronized to the music. In some implementations, the video edit may include a looping video edit that repeats and/or that may be repeated to provide continuous/unbroken footage (e.g., with seamless video and audio loops).

The video edit may be generated as encoded video edit (e.g., encoded video file) and/or as instructions for presenting the video edit. For example, the video edit may be generated as an encoded version of a particular video clip, and the video clip may be opened in a video player for presentation on the display(s). The video edit may be generated as instructions identifying portion(s) of the video (e.g., temporal portions, video frames) that are included in the video edit, the order in which the portion(s) appear, the effects (e.g., visual effect, audio effect, temporal effect) to the applied to the portion(s), and the music to accompany the presentation. A video player may use the instructions to retrieve the portion(s) of the video and the music identified in the instructions for playback.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
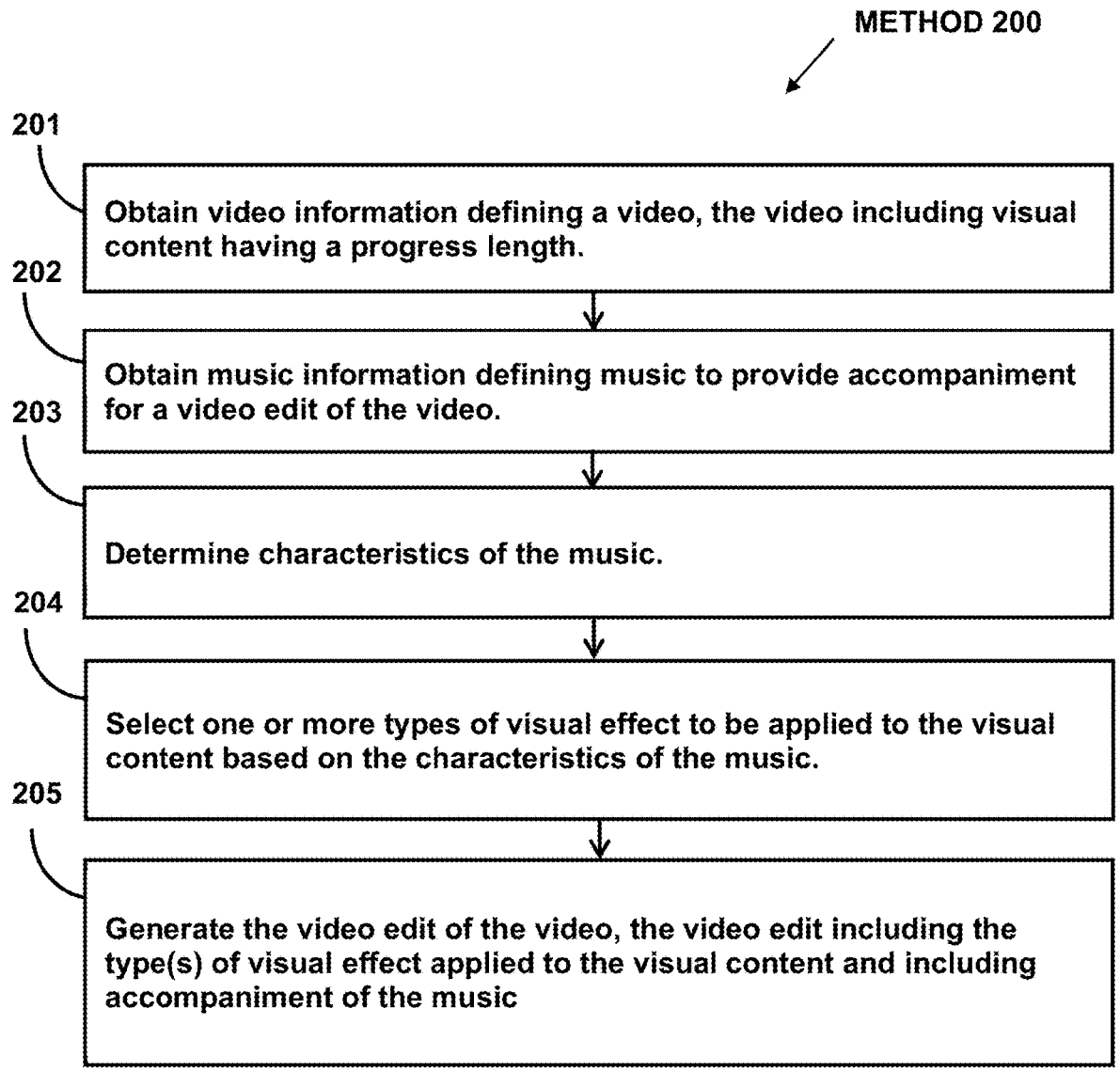
FIG. 2 illustrates a method for editing videos using music characteristics.

FIG. 2 illustrates method 200 for editing videos using music characteristics. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include visual content having a progress length. In some implementations, operation 201 may be performed by a processor component the same as or similar to the video information component 102 (Shown in FIG. 1 and described herein).

At operation 202, music information may be obtained. The music information may define music to provide accompaniment for a video edit of the video. In some implementations, operation 202 may be performed by a processor component the same as or similar to the music information component 104 (Shown in FIG. 1 and described herein).

At operation 203, characteristics of the music may be determined. In some implementations, operation 203 may be performed by a processor component the same as or similar to the characteristic component 106 (Shown in FIG. 1 and described herein).

At operation 204, one or more types of visual effect to be applied to the visual content may be selected based on the characteristics of the music and/or other information. In some implementations, operation 204 may be performed by a processor component the same as or similar to the visual effect component 108 (Shown in FIG. 1 and described herein).

At operation 205, the video edit of the video may be generated. The video edit may include the type(s) of visual effect applied to the visual content and may include accompaniment of the music. In some implementations, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for editing videos, the system comprising:
one or more physical processors configured by machine-readable instructions to:
obtain video information defining a video, the video including visual content having a progress length;
obtain a music file defining a recording of music to provide accompaniment for a video edit of the video, the recording of the music generated by a computing device using a MIDI file for the music, characteristics of the music defined within MIDI information of the MIFI file, wherein the MIDI information of the MIDI file that defines the characteristics of the music is embedded in a metadata track of the music file for the recording of the music, the characteristics of the music including beats and melody of the music;
extract the characteristics of the music from the metadata track of the music file without analyzing the recording of the music;
select one or more types of visual effect to be applied to the visual content based on the characteristics of the music; and
generate the video edit of the video, the video edit including the one or more types of visual effect applied to the visual content and including accompaniment of the music.

2. The system of claim 1, wherein the characteristics of the music further include pitch and velocity of notes of the music.

3. The system of claim 2, wherein the characteristics of the music further include duration of the notes of the music.

4. The system of claim 2, wherein the characteristics of the music further include instrument types for the notes of the music.

5. The system of claim 1, wherein the embedding of the MIDI information of the MIDI file in the metadata track of the music file for the recording of the music enables the beats and the melody of the music to be identified without analyzing the recording of the music.

6. The system of claim 1, wherein the extraction of the characteristics of the music from the metadata track of the music file results in more exact or more precise determination of the characteristics of the music than from analyzing the recording of the music.

7. The system of claim 1, wherein the video edit includes a given visual effect starting before a given beat of the music to maximize effect of the given visual effect at the given beat of the music.

8. The system of claim 1, wherein a first type of visual effect to be applied to the visual content is selected based on the beat of the music and a second type of visual effect to be applied to the visual content is selected based on the melody of the music, the first type of visual effect different from the second type of visual effect, the first type of visual effect including a zoom effect that cyclically changes a size of a field of view of the visual content that is included within the video edit, wherein the video edit cycles through different zoom levels at different beats of the music.

9. The system of claim 8, wherein the second type of visual content includes a lighting effect.

10. A method for editing videos, the method performed by a computing system including one or more processors, the method comprising:
    obtaining, by the computing system, video information defining a video, the video including visual content having a progress length;
    obtaining, by the computing system, a music file defining a recording of music to provide accompaniment for a video edit of the video, the recording of the music generated by a computing device using a MIDI file for the music, characteristics of the music defined within MIDI information of the MIFI file, wherein the MIDI information of the MIDI file that defines the characteristics of the music is embedded in a metadata track of the music file for the recording of the music, the characteristics of the music including beats and melody of the music;
    extracting, by the computing system, the characteristics of the music from the metadata track of the music file without analyzing the recording of the music;
    selecting, by the computing system, one or more types of visual effect to be applied to the visual content based on the characteristics of the music; and
    generating, by the computing system, the video edit of the video, the video edit including the one or more types of visual effect applied to the visual content and including accompaniment of the music.

11. The method of claim 10, wherein the characteristics of the music further include pitch and velocity of notes of the music.

12. The method of claim 11, wherein the characteristics of the music further include duration of the notes of the music.

13. The method of claim 11, wherein the characteristics of the music further include instrument types for the notes of the music.

14. The method of claim 10, wherein the embedding of the MIDI information of the MIDI file in the metadata track of the music file for the recording of the music enables the beats and the melody of the music to be identified without analyzing the recording of the music.

15. The method of claim 10, wherein extracting the characteristics of the music from the metadata track of the music file results in more exact or more precise determination of the characteristics of the music than from analyzing the recording of the music.

16. The method of claim 10, wherein the video edit includes a given visual effect starting before a given beat of the music to maximize effect of the given visual effect at the given beat of the music.

17. The method of claim 10, wherein a first type of visual effect to be applied to the visual content is selected based on the beat of the music and a second type of visual effect to be applied to the visual content is selected based on the melody of the music, the first type of visual effect different from the second type of visual effect, the first type of visual effect including a zoom effect that cyclically changes a size of a field of view of the visual content that is included within the video edit, wherein the video edit cycles through different zoom levels at different beats of the music.

18. The method of claim 17, wherein the second type of visual content includes a lighting effect.

19. A system for editing videos, the system comprising:
    one or more physical processors configured by machine-readable instructions to:
        obtain video information defining a video, the video including visual content having a progress length;
        obtain a music file defining a recording of music to provide accompaniment for a video edit of the video, the recording of the music generated by a computing device using a MIDI file for the music, characteristics of the music defined within MIDI information of the MIFI file, wherein the MIDI information of the MIDI file that defines the characteristics of the music is embedded in a metadata track of the music file for the recording of the music, the characteristics of the music including beats and melody of the music and pitch, velocity, and duration of notes of the music;
        extract the characteristics of the music from the metadata track of the music file without analyzing the recording of the music;
        select one or more types of visual effect to be applied to the visual content based on the characteristics of the music; and
        generate the video edit of the video, the video edit including the one or more types of visual effect applied to the visual content and including accompaniment of the music.

20. The system of claim 19, wherein:
    the embedding of the MIDI information of the MIDI file in the metadata track of the music file for the recording of the music enables the beats and the melody of the music and the pitch, the velocity, and the duration of the notes of the music to be identified without analyzing the recording of the music; and
    the extraction of the characteristics of the music from the metadata track of the music file results in more exact or more precise determination of the characteristics of the music than from analyzing the recording of the music.

* * * * *

UNITED STATES PATENT AND TRADEMARK OFFICE
CERTIFICATE OF CORRECTION

| | | |
|---|---|---|
| PATENT NO. | : 11,955,142 B1 | Page 1 of 1 |
| APPLICATION NO. | : 17/201448 | |
| DATED | : April 9, 2024 | |
| INVENTOR(S) | : Guillaume Oulès | |

It is certified that error appears in the above-identified patent and that said Letters Patent is hereby corrected as shown below:

In the Claims

In Claim 1, Column 14, Line 45, please delete "MIFI" and insert --MIDI--, therefor.

In Claim 10, Column 15, Line 38, please delete "MIFI" and insert --MIDI--, therefor.

In Claim 19, Column 16, Line 36, please delete "MIFI" and insert --MIDI--, therefor.

Signed and Sealed this
Eighteenth Day of February, 2025

Coke Morgan Stewart
*Acting Director of the United States Patent and Trademark Office*